(12) United States Patent
Price (10) Patent No.: US 10,125,911 B2
(45) Date of Patent: Nov. 13, 2018

(54) COMPRESSOR GASKET AND METHOD OF PREVENTING CORROSION

(71) Applicant: THERMO KING CORPORATION, Minneapolis, MN (US)

(72) Inventor: Daniel L. Price, Bloomington, MN (US)

(73) Assignee: THERMO KING CORPORATION, Minneapolis, MN (US)

( * ) Notice: Subject to any disclaimer, the term of this patent is extended or adjusted under 35 U.S.C. 154(b) by 15 days.

(21) Appl. No.: 15/394,225

(22) Filed: Dec. 29, 2016

(65) Prior Publication Data

US 2017/0191590 A1    Jul. 6, 2017

Related U.S. Application Data

(60) Provisional application No. 62/273,669, filed on Dec. 31, 2015.

(51) Int. Cl.
| | |
|---|---|
| *F16J 15/12* | (2006.01) |
| *F16L 58/18* | (2006.01) |
| *F16J 15/08* | (2006.01) |
| *F16L 23/18* | (2006.01) |
| *F16L 23/24* | (2006.01) |

(52) U.S. Cl.
CPC ......... *F16L 58/187* (2013.01); *F16J 15/0812* (2013.01); *F16J 15/122* (2013.01); *F16L 23/18* (2013.01); *F16L 23/24* (2013.01)

(58) Field of Classification Search
CPC .......... F16J 15/06; F16J 15/08; F16J 15/0806; F16J 15/0812; F16J 15/0818; F16J 15/10; F16J 15/12; F16J 15/121; F16L 15/0812; F16L 23/18; F16L 23/24
See application file for complete search history.

(56) References Cited

U.S. PATENT DOCUMENTS

| | | | |
|---|---|---|---|
| 1,851,948 A | 3/1932 | Summers | |
| 3,053,544 A | 9/1962 | Gorsica | |
| 3,653,673 A | 4/1972 | Green | |
| 3,656,769 A | 4/1972 | Jelinek et al. | |
| 4,540,183 A * | 9/1985 | Schneider | F16J 15/10 277/312 |
| 5,628,113 A | 5/1997 | Tanaka et al. | |
| 5,975,539 A | 11/1999 | Ueda et al. | |
| 6,092,810 A | 7/2000 | Plunkett | |
| 6,422,573 B1 | 7/2002 | Sekioka | |
| 6,682,081 B2 | 1/2004 | Burton et al. | |
| 6,893,023 B2 * | 5/2005 | Kato | F16J 15/0818 277/592 |
| D644,721 S * | 9/2011 | Bond | D23/269 |
| D644,722 S * | 9/2011 | Bond | D23/269 |

(Continued)

*Primary Examiner* — Gilbert Y Lee
(74) *Attorney, Agent, or Firm* — Hamre, Schumann, Mueller & Larson, P.C.

(57) ABSTRACT

A gasket in a transport refrigeration system (TRS) and method of preventing corrosion in a compressor using a gasket. The gasket includes a body, where the body includes a fluid pass portion, and a flange that extends from the body. The body and the flange include a second layer between an outside first layer and a third layer. The second layer is a metal and the metal is a non-uniform thickness that extends across the flange and the body to deflect compression load distribution.

20 Claims, 6 Drawing Sheets

(56) References Cited

U.S. PATENT DOCUMENTS

| | | | |
|---|---|---|---|
| 8,496,253 B2 * | 7/2013 | Goettler | F16J 15/0818 |
| | | | 277/593 |
| 8,500,131 B2 | 8/2013 | Schweiger | |
| 9,175,637 B2 | 11/2015 | Stout et al. | |
| D749,708 S * | 2/2016 | Smith | D23/269 |
| 2008/0143060 A1 | 6/2008 | Casler et al. | |
| 2008/0223060 A1 * | 9/2008 | Chakiachvili | B60H 1/00535 |
| | | | 62/244 |
| 2014/0333036 A1 | 11/2014 | Kullen | |
| 2015/0330509 A1 | 11/2015 | Malus | |

* cited by examiner

COMPRESSOR GASKET AND METHOD OF PREVENTING CORROSION

FIELD

This disclosure relates generally to a transport refrigeration system (TRS). More specifically, this disclosure relates to a compressor gasket in a transport refrigeration system (TRS) and a method of preventing corrosion in a compressor using a gasket.

BACKGROUND

A transport refrigeration system (TRS) is generally used to control one or more environmental conditions such as, but not limited to, temperature, humidity, and/or air quality of a transport unit. Examples of transport units include, but are not limited to, a container (e.g., container on a flat car, an intermodal container, etc.), a truck, a boxcar, or other similar transport units. A refrigerated transport unit is commonly used to transport perishable items such as produce, frozen foods, and meat products.

Generally, the refrigerated transport unit includes a transport unit and a TRS. The TRS includes a transport refrigeration unit (TRU) that is attached to the transport unit to control one or more environmental conditions (e.g., temperature, humidity, etc.) of a particular space (e.g., a cargo space, a passenger space, etc.) (generally referred to as a "conditioned space"). The TRU can include, without limitation, a compressor, a condenser, an expansion valve, an evaporator, and fans or blowers to control the heat exchange between the air inside the conditioned space and the ambient air outside of the refrigerated transport unit.

SUMMARY

This disclosure relates generally to a transport refrigeration system (TRS). More specifically, this disclosure relates to a compressor gasket in a transport refrigeration system (TRS) and method of preventing corrosion in a compressor using a gasket.

For example, in some embodiments, the gasket can prevent corrosion at a compressor flange sealing service. In particular, the gasket can prevent galvanic corrosion when a brass flange is bolted directly to an aluminum flange.

In some embodiments, the gasket can include a body with a fluid pass portion and a flange that extends from the body. The body and the flange include a second layer between an outside first layer and a third layer. In some embodiments, the second layer can be a metal with a non-uniform thickness that extends across the flange and the body to deflect compression load distribution.

BRIEF DESCRIPTION OF THE DRAWINGS

References are made to the accompanying drawings that form a part of this disclosure, and which illustrate the embodiments in which the systems and methods described in this Specification can be practiced.

Like reference numbers represent like parts throughout.

DETAILED DESCRIPTION

This disclosure relates generally to a transport refrigeration system (TRS). More specifically, this disclosure relates to a compressor gasket in a transport refrigeration system (TRS) and method of preventing corrosion in a compressor using a gasket.

The gasket provided herein can also be used in many other applications, such as, but not limited to, sealing a refrigerant and/or air conditioning system. The gasket can also be used as part of a multilayer gasket with a varying cross section to seal a suction service valve to a suction adapter.

A TRS can include a heat transfer circuit. The heat transfer circuit can include a compressor with an attached compressor gasket. In some embodiments, the compressor gasket can include a body with a fluid pass portion and a flange extending from the body. The body and the flange can include a second layer between a first layer and a third layer, with the second layer being a metal. The metal can have a first thickness in the body and a second thickness in the flange.

The compressor gasket can generally be used to improve load distribution and prevent leakage. This is generally accomplished by deflecting a compression load distribution via the different layers with a metal core (e.g., second layer) and/or different metal thicknesses with a smooth transition throughout the gasket.

A TRS is generally used to control one or more environmental conditions such as, but not limited to, temperature, humidity, and/or air quality of a transport unit. Examples of transport units include, but are not limited to, a container (e.g., container on a flat car, an intermodal container, etc.), a truck, a boxcar, or other similar transport units. A transport unit with a TRS (e.g., a refrigerated transport unit) can be used to transport perishable items such as, but not limited to, flowers, pharmaceuticals, produce, frozen foods, and meat products.

As disclosed in this Specification, a TRS can include a transport refrigeration unit (TRU) which is attached to a transport unit to control one or more environmental conditions (e.g., temperature, humidity, air quality, etc.) of an interior space of the refrigerated transport unit. The TRU can include, without limitation, a compressor, a condenser, an expansion valve, an evaporator, and one or more fans or blowers to control the heat exchange between the air within the interior space and the ambient air outside of the refrigerated transport unit.

A "transport unit" includes, for example, a container (e.g., container on a flat car, an intermodal container, etc.), truck, a boxcar, or other similar transport unit. The TRS may include a vapor-compressor type refrigeration system, a thermal accumulator type system, or any other suitable refrigeration system that can use refrigerant, cold plate technology, or the like.

A "refrigerated transport unit" includes, for example, a transport unit having a TRS.

Embodiments of this disclosure may be used in any suitable environmentally controlled transport apparatus, such as, but not limited to, a shipboard container, an air cargo cabin, and an over the road truck cabin (e.g., tractor trailer, semi truck, etc.).

Figure 1:
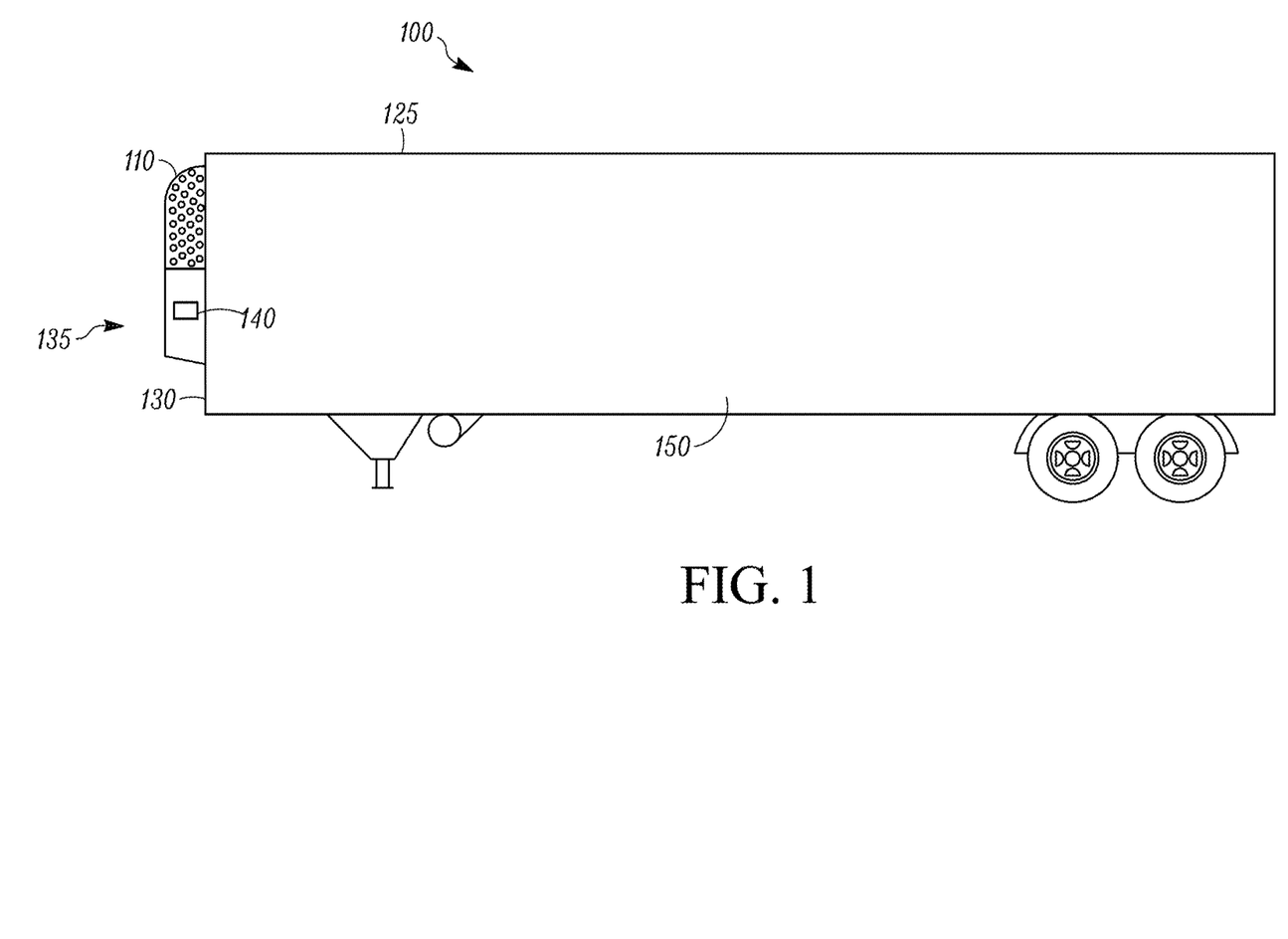
FIG. 1 illustrates a side view of a refrigerated transport unit, according to an embodiment.

FIG. 1 illustrates a side view of a TRS 100 for a transport unit 125, according to some embodiments. The illustrated transport unit 125 is a trailer-type transport unit. Embodiments as described in this Specification can be used with other types of transport units. For example, the transport unit 125 can represent a container (e.g., a container on a flat car, an intermodal container, etc.), a truck, a boxcar, or other similar type of transport unit including an environmentally controllable interior space.

The TRS 100 is configured to control one or more environmental conditions such as, but not limited to, temperature, humidity, and/or air quality of an interior space 150 of the transport unit 125. In some embodiments, the interior space 150 can alternatively be referred to as the conditioned space 150, the cargo space 150, the environmentally controlled space 150, or the like. In particular, the TRS 100 is configured to transfer heat between the air inside the interior space 150 and the ambient air outside of the transport unit 125.

The interior space 150 can include one or more partitions or internal walls (not shown) for at least partially dividing the interior space 150 into a plurality of zones or compartments, according to some embodiments. It is to be appreciated that the interior space 150 may be divided into any number of zones and in any configuration that is suitable for controlling the environment of the different zones. In some examples, each of the zones can have a set point temperature that is the same or different from one another.

The TRS 100 includes a transport refrigeration unit (TRU) 110. The TRU 110 is provided on a front wall 130 of the transport unit 125. The TRU 110 can include a prime mover (e.g., an internal combustion engine) (not shown) that provides power to one or more components (e.g., a compressor, one or more fans, a TRS controller, a battery charger, etc.) of the TRS 100.

The TRU 110 includes a programmable TRS Controller 135 that includes a single integrated control unit 140. It is to be appreciated that, in some embodiments, The TRS controller 135 may include a distributed network of TRS control elements (not shown). The number of distributed control elements in a given network can depend upon the particular application of the principles described in this Specification. The TRS Controller 135 can include a processor, a memory, a clock, and an input/output (I/O) interface (not shown). The TRS Controller 135 can include fewer or additional components.

The TRU 110 also includes a heat transfer circuit (not shown). Generally, the TRS Controller 135 can be configured to control a heat transfer cycle (e.g., controlling the heat transfer circuit of the TRU 110) of the TRS 100. In one example, the TRS Controller 135 can control the heat transfer cycle of the TRS 100 to obtain various operating conditions (e.g., temperature, humidity, air quality etc.) of the interior space 150.

Figure 2:
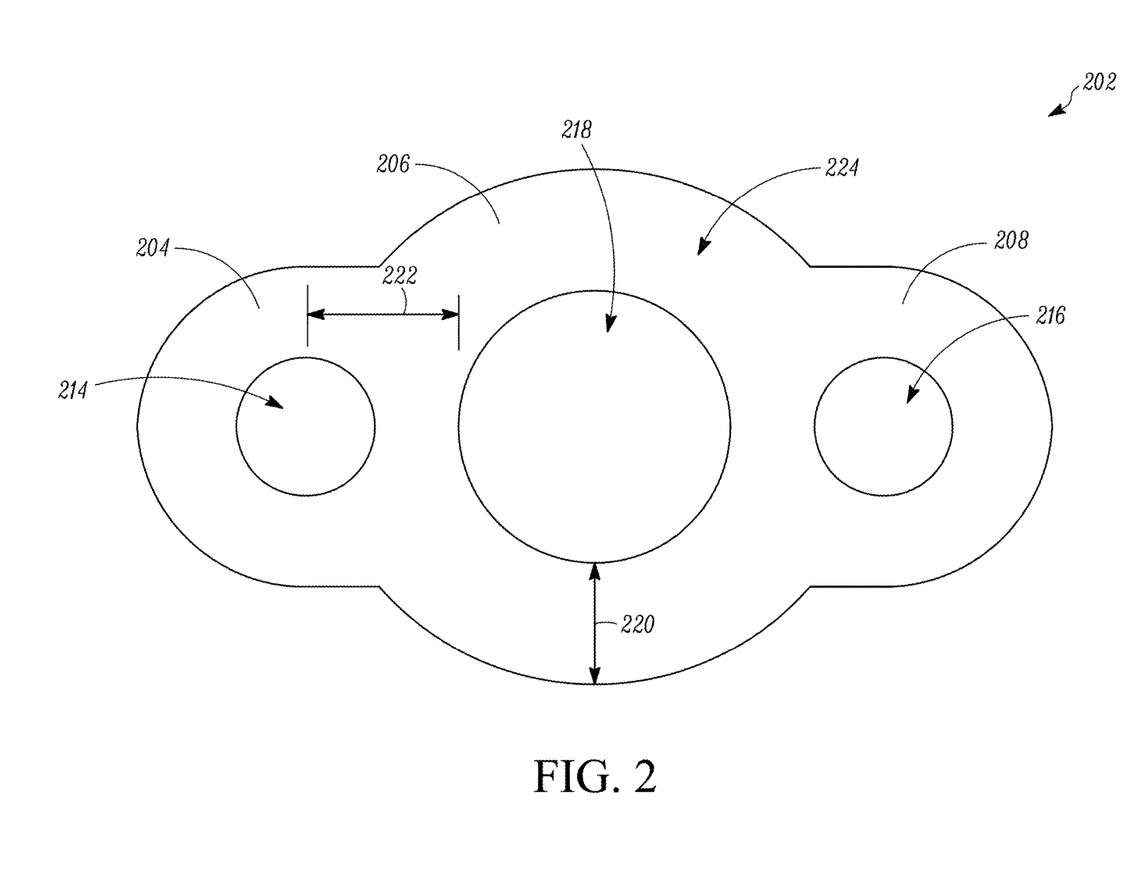
FIG. 2 illustrates a plan view of a compressor gasket, according to an embodiment.

FIG. 2 illustrates a plan view of a compressor gasket 202, according to an embodiment. The compressor gasket 202 can be used in the TRS (e.g., 100 shown in FIG. 1). As used herein, "compressor gasket" and "gasket" are used interchangeably throughout the detailed description.

The compressor gasket 202 includes a body 206. A first flange flange 204 and a second flange 208 extend from the body 206. The flanges 204, 208 each include a respective hole 214, 216. The holes 214, 216 can accept a fastener (e.g., bolt, screw, etc.) to attach the flanges 204, 208 and the body 206 from which the flanges 204, 208 extend, to a compressor (not shown; e.g., the compressor in the TRS 100 in FIG. 1). In some embodiments, the gasket 202 can be used to provide a seal at a compressor discharge manifold to and/or between a cylinder head location (not shown). Additionally, or alternatively, in some embodiments, the gasket 202 can be used in any other location in which the gasket 202 can be added to seal refrigerant in the refrigeration and/or air conditioning system. For example, the gasket 202 can be added to a suction service valve location in the refrigeration and/or air conditioning system (not shown).

The gasket 202 can be attached to the compressor via attaching the fastener through the hole 214, 216. As shown in FIG. 2, the first flange 204 and the second flange 208 can extend from different locations off the body 206. For example, the first flange 204 and the second flange 208 can extend from opposite sides of the body 206.

In some embodiments, the first flange 204 can include a non-stick coating on a first surface, and the second flange 208 can include the non-stick coating on a second surface. For example, the first flange 204 can include a non-stick coating on a top surface 224 while the second flange 208 can include the non-stick coating on a bottom surface (not shown). The non-stick coating can aid in preventing corrosion to the compressor and/or any attachments associated with the gasket 202.

The body 206 includes a fluid pass portion 218. The fluid pass portion 218 can allow fluid, such as heat transfer fluid, refrigerant, coolant, or the like to pass through the gasket and in and/or out of the compressor. The fluid traveling through the fluid pass portion 218 can be distributed through the heat transfer circuit of the TRS (e.g., 100 shown in FIG. 1).

In some embodiments, a length 220 of the gasket 202 can vary. That is, the length 220 of the gasket 202 can be different from one point on the gasket 202 to a different point on the gasket 202. For example, the length 220 of the gasket may be formed to accommodate an amount of fluid to travel through the fluid pass portion 218. For instance, an increased amount of fluid to travel through the fluid pass portion 218 may decrease the length 220 of the gasket 202, and vice versa.

Figure 3:
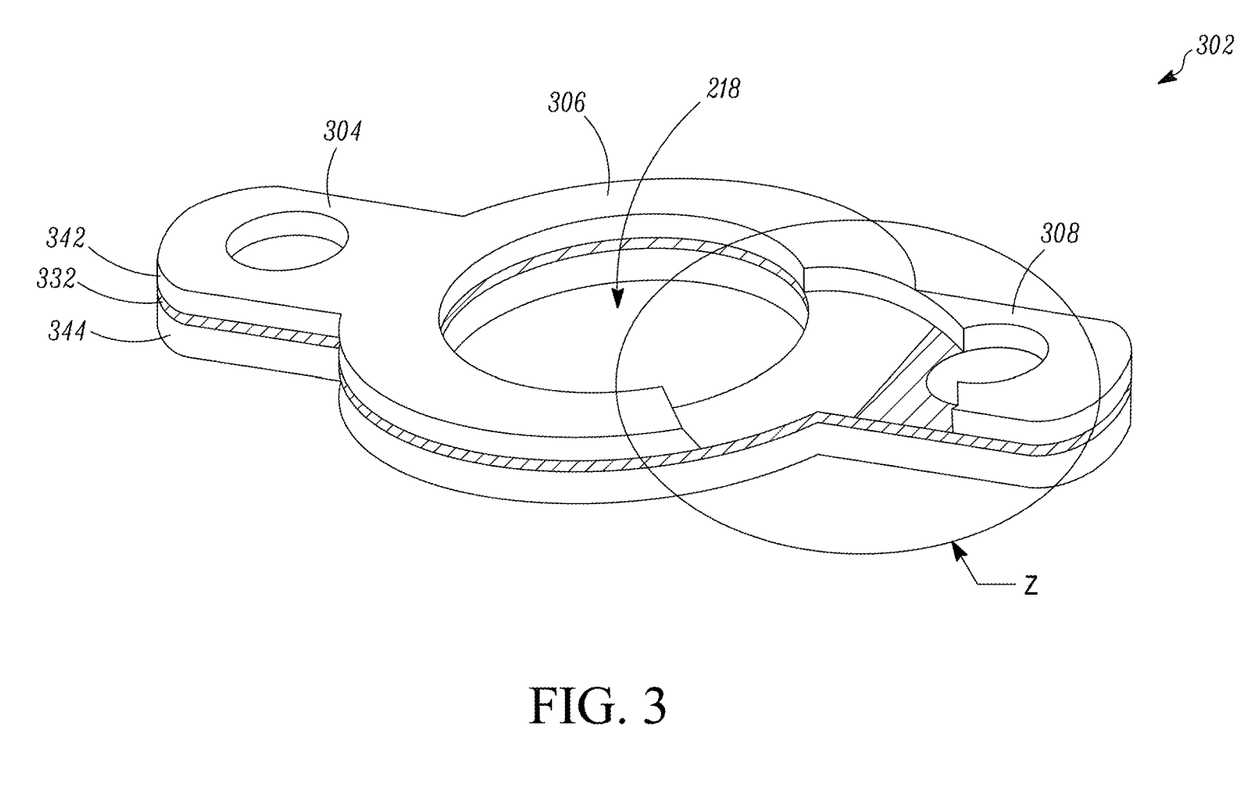
FIG. 3 illustrates a cross-sectional view of a compressor gasket, according to an embodiment.
Figure 4:
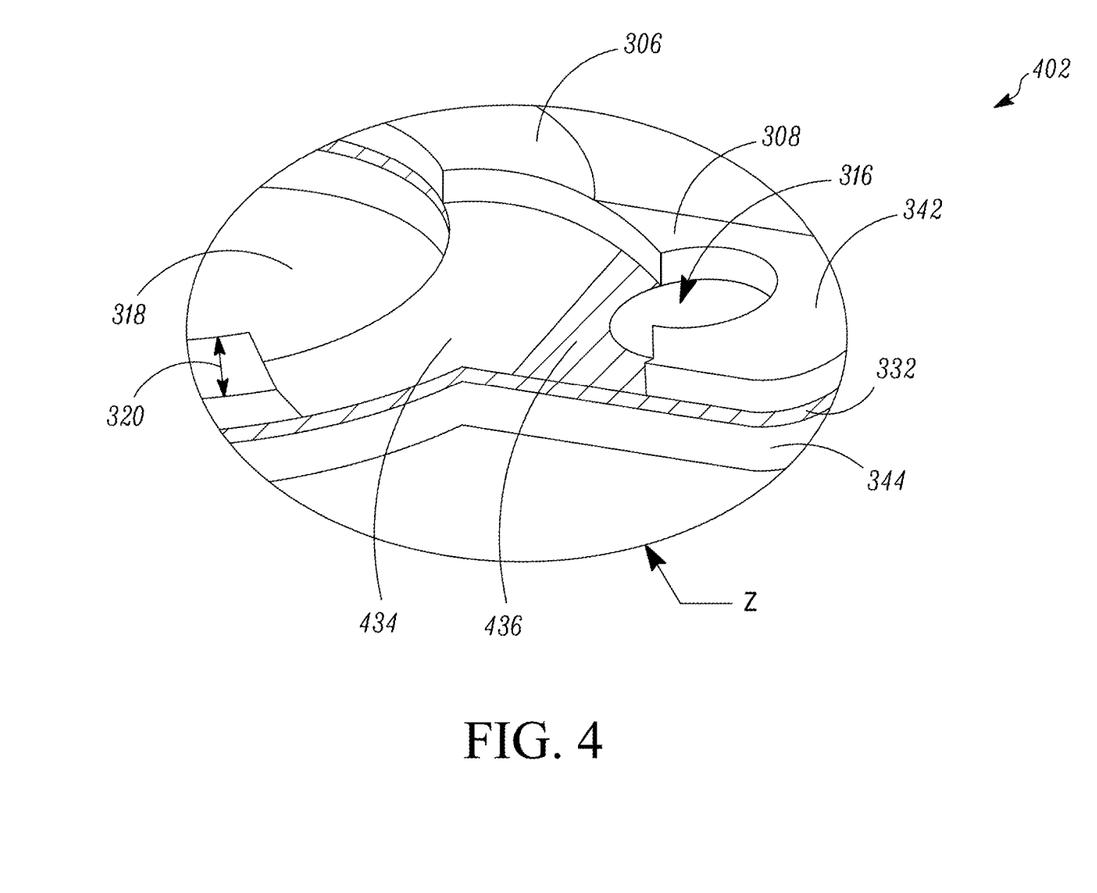
FIG. 4 illustrates a cross-sectional view of a compressor gasket, according to an embodiment.
Figure 5:
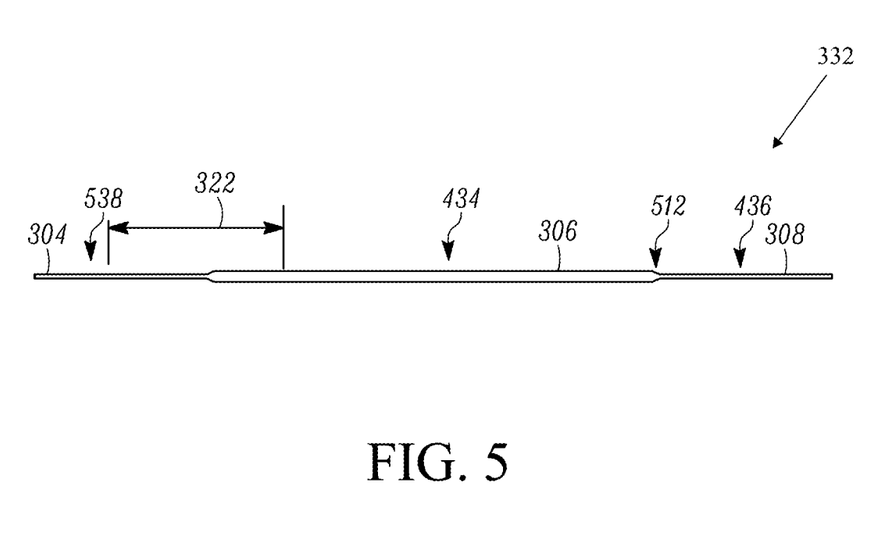
FIG. 5 illustrates a cross-sectional view of a thickness of a compressor gasket, according to an embodiment.

As discussed further herein with respect to FIGS. 3-5, the body 206 and the flange 204, 208 include an interior second layer between an outside first layer and an outside third layer, and in which the interior layer can be a metal. Although FIGS. 3-4 depict three layers, in some embodiments, additional and/or fewer layers can be present and/or absent. In some embodiments, the interior second layer can have a non-uniform thickness 222 that extends across the flanges 204, 208 and the body 206. For instance, in one embodiment, the interior second layer 322 on both flanges can be non-uniform thickness 222 that may be increased within the body 206 and decreased in the flanges 204, 208 of the gasket 202. The non-uniform thickness 222 can distribute a compression load throughout the gasket 202 to prevent leaks and/or corrosion.

FIGS. 3-5 illustrate different views of the compressor gasket 302, according to an embodiment.

The compressor gasket 302 includes a body 306, a pair of flanges 304, 308 each with a hole for a fastener, a fluid pass portion 218. The body 306 includes a length 320. The gasket 302 can be attached to a compressor, such as the compressor in the TRS (e.g., the TRS 100 shown in FIG. 1).

The body 306 and the flanges 304, 308 include an interior second layer 332 between a first outer layer 344 and a third outer layer 342. The interior second layer 332 can be formed of a metal and/or metal combination. In some embodiments, the interior second layer 332 can be composed of a solid metal and/or of a steel core. That is, in some embodiments, when the interior second layer 332 is composed of a solid metal, it can prevent contact between the first outer layer 344 and the third outer layer 342.

The interior second layer 322 can have a first thickness in the body 306 and a second thickness in the flanges 304, 308. That is, the interior second layer 332 at the body 306 can have a particular thickness while the interior second layer 322 of the flanges 304, 308 can have a different thickness. The thicknesses of the interior second layer 322 in the flanges 304, 308 enable deflection of a compression load distribution. That is, the different thicknesses of the interior second layer 322 between the body 306 and the flanges 304, 308 can distribute the compression load throughout the gasket 302 to prevent leaks and/or corrosion.

In some embodiments, the interior second layer 322 can include a third thickness at one or more of the flanges 304, 308. For example, the interior second layer 322 at the body 306 can have a first thickness, while the flange 304 can have a second thickness, while the flange 308 can have a third thickness. The different thicknesses can aid to distribute compression loads among the gasket 302.

In some embodiments, the interior second layer 322 can be formed in a mesh pattern. For example, the interior second layer 322 can be formed in a crisscrossed, lattice shaped formation. That is, in some embodiments, the interior second layer 322 may not be formed of a solid material. In some embodiments, when the interior second layer 322 can be formed of a mesh formation, including a lattice shaped formation, and the first and third layers can be in contact through holes in the mesh formation.

FIG. 4 illustrates a cross-sectional view of a compressor gasket, according to an embodiment. FIG. 4 is an enlarged view of cut-away section Z of FIG. 3.

The body 306 and the flange 308 include the interior second layer 332 between an outside first layer 342 and an outside third layer 344. The interior second layer 322 can be a metal and/or metal material, while the first layer 342 and the third layer 344 can be a non-metallic and/or a fiber type non-asbestos gasket material (e.g., a Reinz company material). Additionally, or alternatively, in some embodiments, the interior second layer 332 can have a uniform thickness (not shown) in the body 306 and the flanges 304, 308.

FIG. 4 illustrates the interior second layer 332 having a first thickness 434 and a second thickness 436. That is, in some embodiments, the interior second layer 332 can have a non-uniform thickness 434, 436. The interior second layer 332 can be thicker or thinner. The interior second layer 334 can have a thickness that can be increased/decreased within the body 306 and increased/decreased in the flange of the gasket 302. The interior second layer 332 with non-uniform thickness(es) 434, 436 can distribute a compression load throughout the gasket 302 to prevent leaks and/or corrosion.

In some embodiments, a grain direction associated with the first layer 442 can be perpendicular to a grain direction associated with the third layer 444. That is, the grain direction of a respective layer can be different from a grain direction of a different respective layer to provide additional support to the gasket 302 structure.

FIG. 5 illustrates a cross-sectional view of a thickness of a compressor gasket, according to an embodiment. FIG. 5 depicts the interior second layer 332 of FIGS. 3-4 without any additional layers (e.g., first layer and/or third layer).

The interior second layer 332 has a non-uniform thickness 322 that has different thicknesses spanning the body 306 and the flanges 304, 308 of the gasket. The non-uniform thickness 322 can include a first thickness 434, a second thickness 436, and a third thickness 538 that correspond to different portions of the gasket (e.g., the flanges 304, 308 and the body 306). In some embodiments, the interior second layer 332 can be composed of a metal that is fine-blanked, coined, or embossed to form the non-uniform thickness 322. In some embodiments, the metal can be a contoured non-uniform thickness and include solid steel.

The interior second layer 332 can have the non-uniform thickness 322. As shown in FIG. 5, the non-uniform thickness 322 has a smooth transition 512 from the first thickness to the second thickness. The non-uniform thickness 322 can distribute compressor pressure from the compressor and prevent leak paths.

Figure 6:
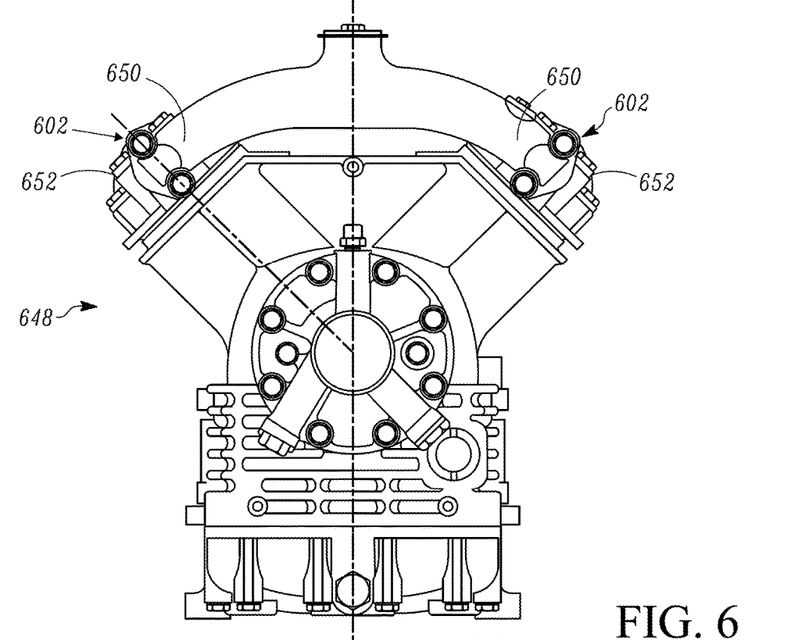
FIG. 6 illustrates a plan view of a compressor gasket in a compressor, according to an embodiment.

FIG. 6 illustrates a plan view of a compressor gasket 602 in a compressor 648, according to an embodiment. FIG. 6 depicts the compressor gasket 602 of FIGS. 2-5 as positioned on a compressor 648, in an embodiment.

The compressor 648 can be a part of an intricate system, such as a refrigeration system. The compressor 648 includes a discharge manifold 650 to transport heat transfer fluid (e.g., refrigerant) from a cylinder head 652 of the compressor 648. The compressor gasket 602 can be positioned such that it is between the cylinder head 652 and the discharge manifold 650. The compressor gasket 648 can be securely attached therebetween with bolts, screws, or the like via the holes (e.g., 214, 216 in FIG. 2).

The compressor gasket 602 can be used to improve load distribution and prevent leakage. For example, the compressor gasket 602 can deflect the compression load distribution via the different layers with a metal core (e.g., 332 in FIGS. 3-5) and/or different metal thicknesses with a smooth transition throughout the compressor gasket 602.

Figure 7:
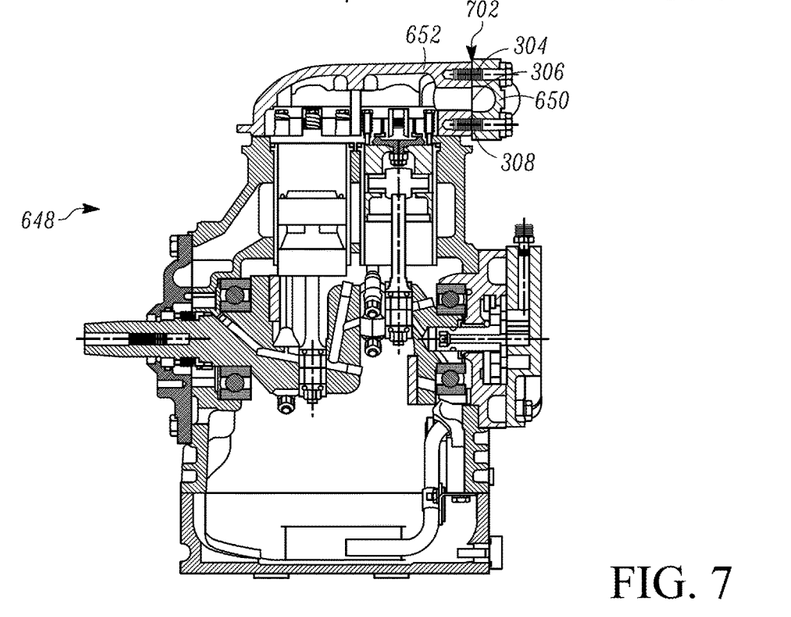
FIG. 7 illustrates a cross-section view of a compressor gasket on a compressor, according to an embodiment.

FIG. 7 illustrates a cross-section view of a compressor gasket 702 on a compressor, according to an embodiment. FIG. 7 is a cut-away section A of FIG. 6.

The compressor gasket 702 is attached between the discharge manifold 650 and the cylinder head 652 of the compressor 648. The compressor gasket 648 is securely attached there between with bolts via the holes (e.g., 214, 216 in FIG. 2) in the flanges 304, 308 of the compressor gasket 702.

The body 306 of the compressor gasket 702 includes the fluid pass portion (e.g., 218 in FIG. 2). In some embodiments, the compressor gasket 702 can be attached to the compressor 648 such that heat transfer fluid can flow from the compressor 648 cylinder heads 652 through the fluid pass portion of the body 306 to the discharge manifold 650. The discharge manifold 650 can, in some embodiments, distribute the heat transfer fluid throughout the system associated with the compressor.

The terminology used in this Specification is intended to describe particular embodiments and is not intended to be limiting. The terms "a," "an," and "the" include the plural forms as well, unless clearly indicated otherwise. The terms "comprises" and/or "comprising," when used in this Specification, indicate the presence of the stated features, integers, steps, operations, elements, and/or components, but do not preclude the presence or addition of one or more other features, integers, steps, operations, elements, and/or components.

With regard to the preceding description, it is to be understood that changes may be made in detail, especially in matters of the construction materials employed and the shape, size, and arrangement of parts without departing from the scope of the present disclosure. The word "embodiment"

as used within this Specification may, but does not necessarily, refer to the same embodiment. This Specification and the embodiments described are exemplary only. Other and further embodiments may be devised without departing from the basic scope thereof, with the true scope and spirit of the disclosure being indicated by the claims that follow.

ASPECTS

Any one of aspects 1-8 can be combined with any one of aspects 9-14 and/or aspects 15-17. Any one of aspects 9-14 can be combined with any one of aspects 1-8 and/or aspects 15-17. Any one of aspects 15-17 can be combined with any one of aspects 1-8 and/or 9-14.

Aspect 1. A gasket, comprising:
a body, wherein the body includes a fluid pass portion; and
a flange that extends from the body, wherein the body and flange include:
a second layer between an outside first layer and a third layer, wherein the second layer is a metal; and
wherein the metal is a non-uniform thickness that extends across the flange and the body to distribute compressor pressure.

Aspect 2. The gasket of aspect 1, wherein the non-uniform thickness includes a first thickness, a second thickness, and a third thickness.

Aspect 3. The gasket of any one of aspects 1-2, wherein a grain direction associated with the first layer is perpendicular to a grain direction associated with the third layer.

Aspect 4. The gasket of any one of aspects 1-3, wherein the body of the gasket is adjustable in length.

Aspect 5. The gasket of any one of aspects 1-4, wherein the non-uniform thickness is a smooth transition from a first thickness to a second thickness and distributes a compression load.

Aspect 6. The gasket of any one of aspects 1-5, wherein the metal is fine-blanked, coined, or embossed to form the non-uniform thickness.

Aspect 7. The gasket of any one of aspects 1-6 wherein the metal is a contoured non-uniform thickness and includes solid steel.

Aspect 8. The gasket of any one of aspects 1-7, wherein the flange includes a first flame and a second flange that extend from different portions of the body, and wherein the first flange includes a non-stick coating on a first surface, and the second flange includes the non-stick coating on a second surface.

Aspect 9. A gasket in a transport refrigeration unit (TRU), comprising:
a compressor;
a body associated with the compressor, wherein the body includes a fluid pass portion; and
a flange extending from the body, wherein the body and the flame include:
a second layer between a first layer and a third layer, wherein the second layer is a metal;
wherein the metal is a first thickness in the body and a second thickness in the flange.

Aspect 10. The gasket of aspect 9, wherein the first layer and the second layer are oriented such that a grain direction of the first layer is perpendicular to a grain direction of the third layer.

Aspect 11. The gasket of any one of aspects 9-10, wherein the metal is formed in a mesh pattern.

Aspect 12. The gasket of any one of aspects 9-11, wherein the metal includes a third thickness in the flange.

Aspect 13. The gasket of any one of aspects 9-12, wherein the second thickness in the flange enables deflections for a compression load distribution.

Aspect 14. The gasket of any one of aspects 9-13, wherein the metal is of a mesh form, and the first and second layers are in contact through holes in the mesh form.

Aspect 15. A method for preventing corrosion in a compressor system, comprising:
attaching a gasket to a compressor, wherein the gasket has a non-uniform metal core thickness, and wherein the gasket includes a body with a fluid pass portion;
discharging heat transfer fluid from the compressor, wherein the heat transfer fluid flows through the fluid pass portion of the body of the gasket; and
distributing compressor pressure, created from the discharging, throughout the gasket via the non-uniform thickness.

Aspect 16. The method of aspect 15, further comprising decreasing leak paths along the body of the gasket via the metal core, wherein the metal core is a wire mesh.

Aspect 17. The method of any one of aspects 15-16, further comprising forming the gasket to include different layers with different grain directions to deflect compressor pressure.

What is claimed is:
1. A gasket, comprising:
a body, wherein the body includes a fluid pass portion that allows a fluid to pass through the gasket; and
a flange that extends from the body, wherein the flange is configured to allow the gasket to attach to a structure, wherein both the body and the flange include:
an outside first layer, a second layer and an outside third layer, wherein the second layer is disposed between the outside first layer and the outside third layer,
wherein the second layer is a metal,
wherein the metal has a non-uniform thickness that extends across the flange and the body to distribute a compression load throughout the gasket,
wherein the non-uniform thickness includes a first thickness and a second thickness, the first thickness and the second thickness are different such that the first thickness is thicker than the second thickness,
wherein the metal at the body is formed with the first thickness and the metal at the flange is formed with the second thickness prior to the gasket being attached to the structure.

2. The gasket of claim 1, wherein a grain direction of the outside first layer is perpendicular to a grain direction of the outside third layer.

3. The gasket of claim 1, wherein the body of the gasket is adjustable in length.

4. The gasket of claim 1, wherein the non-uniform thickness is a smooth transition from the first thickness of the metal at the body to the second thickness of the metal at the flange to evenly distribute a compression load across the gasket.

5. The gasket of claim 1, wherein the metal is fine-blanked, coined, or embossed to form the non-uniform thickness.

6. The gasket of claim 1, wherein the metal is a contoured non-uniform thickness and includes solid steel, wherein the solid steel prevents contact between the outside first layer and the outside third layer.

7. The gasket of claim 1, wherein the flange includes a first flange and a second flange that extend from different portions of the body, and wherein the flange includes a non-stick coating on a first surface, and the flange includes the non-stick coating on a second surface, wherein the second surface is opposite to the first surface.

8. The gasket of claim 1, wherein the metal is formed in a mesh pattern, and the outside first layer and the outside third layer are in contact through holes in the mesh pattern.

9. The gasket of claim 1, wherein the flange includes a first flange and a second flange such that the first flange extends from a first side of the body and the second flange extends from a second side of the body that is opposite the first side,
wherein each of the first flange and the second flange include a hole that is configured to accept a fastener for attaching the gasket to the structure.

10. A transport refrigeration unit (TRU), comprising:
a compressor; and
a gasket, the gasket including:
    a body, wherein the body includes a fluid pass portion that allows a fluid to pass through the gasket; and
    a flange extending from the body, wherein the flange is configured to allow the gasket to attach to the compressor,
    wherein both the body and the flange include:
    an outside first layer, a second layer and an outside third layer, wherein the second layer is disposed between the outside first layer and the outside third layer,
    wherein the second layer is a metal,
    wherein the metal has a non-uniform thickness that extends across the flange and the body to distribute a compression load throughout the gasket,
    wherein the non-uniform thickness includes a first thickness and a second thickness, the first thickness and the second thickness are different such that the first thickness is thicker than the second thickness,
    wherein the metal at the body is formed with the first thickness and the metal at the flange is formed with the second thickness prior to the gasket being attached to the structure.

11. The TRU of claim 10, wherein the outside first layer and the second layer are oriented such that a grain direction of the outside first layer is perpendicular to a grain direction of the outside third layer.

12. The TRU of claim 10, wherein the flange includes a first flange and a second flange that extend from different portions of the body, and wherein the metal at the first flange includes the second thickness and the metal at the second flange includes a third thickness that is different from the first thickness and the second thickness.

13. The TRU of claim 10, wherein the non-uniform thickness of the metal is configured to deflect a compression load distribution throughout the gasket.

14. The TRU of claim 10, wherein the metal is formed in a mesh pattern, and the outside first layer and the outside third layer second layers are in contact through holes in the mesh pattern.

15. The TRU of claim 10, wherein the flange includes a first flange and a second flange such that the first flange extends from a first side of the body and the second flange extends from a second side of the body that is opposite the first side,
wherein each of the first flange and the second flange include a hole that is configured to accept a fastener for attaching the gasket to the structure.

16. The TRU of claim 10, wherein the non-uniform thickness of the metal includes a smooth transition between the first thickness of the metal at the body and the second thickness of the metal at the flange to evenly distribute a compression load across the gasket.

17. A method for preventing corrosion in a compressor system, comprising:
attaching a gasket to a compressor, wherein the gasket has a metal core formed with a non-uniform thickness prior to attaching the gasket to the compressor, the non-uniform thickness includes a first thickness of the metal core at a body of the gasket and a second thickness of the metal core at a flange of the gasket, the first thickness of the metal core and the second thickness of the metal core are different such that the first thickness of the metal core is thicker than the second thickness of the metal core, and wherein the body of the gasket includes a fluid pass portion;
discharging heat transfer fluid from the compressor, wherein the heat transfer fluid flows through the fluid pass portion of the body of the gasket and is distributed by a discharge manifold; and
distributing the compression load, created from the discharging, throughout the gasket via the non-uniform thickness.

18. The method of claim 17, further comprising decreasing leak paths along the body of the gasket via the metal core, the metal core provides additional structural support, and wherein the metal core is a wire mesh located between a first layer and a third layer, the wire mesh permits contact between the first layer and the third layer to support a seal.

19. The method of claim 17, wherein the gasket is formed to include different layers with different grain directions to deflect the compression load.

20. The method of claim 17, wherein the non-uniform thickness includes a smooth transition between the first thickness of the metal core at the body and the second thickness of the metal core at the flange to evenly distribute a compression load across the gasket.

* * * * *